(12) United States Patent
Rolland

(10) Patent No.: US 9,141,161 B2
(45) Date of Patent: Sep. 22, 2015

(54) VOLTAGE REGULATION APPARATUS AND METHOD OF VARYING A NUMBER OF CURRENT SOURCES TO PROVIDE A REGULATED VOLTAGE

(75) Inventor: Eric Rolland, Grepiac (FR)

(73) Assignee: Freescale Semiconductor, Inc., Austin, TX (US)

( * ) Notice: Subject to any disclaimer, the term of this patent is extended or adjusted under 35 U.S.C. 154(b) by 1840 days.

(21) Appl. No.: 12/304,852

(22) PCT Filed: Jun. 23, 2006

(86) PCT No.: PCT/IB2006/052667
§ 371 (c)(1),
(2), (4) Date: Dec. 15, 2008

(87) PCT Pub. No.: WO2008/001163
PCT Pub. Date: Jan. 3, 2008

(65) Prior Publication Data
US 2010/0060083 A1    Mar. 11, 2010

(51) Int. Cl.
*H02J 1/00* (2006.01)
*G06F 1/26* (2006.01)
*H02M 3/157* (2006.01)

(52) U.S. Cl.
CPC ............. *G06F 1/263* (2013.01); *H02M 3/157* (2013.01); *Y10T 307/696* (2015.04)

(58) Field of Classification Search
CPC ......... G06F 1/263; H02M 3/157; H02M 3/04; H02M 3/1588; H02M 3/1584; Y02B 70/1466; Y10T 307/696; H02J 1/00
USPC ................................. 323/282, 284, 285, 351
See application file for complete search history.

(56) References Cited

U.S. PATENT DOCUMENTS

| 4,217,634 A | 8/1980 | Dalley et al. | |
|---|---|---|---|
| 4,812,737 A * | 3/1989 | Fleck | 323/271 |
| 4,947,101 A * | 8/1990 | McVey | 323/272 |
| 6,020,770 A * | 2/2000 | Madsen et al. | 327/117 |
| 7,583,774 B2 * | 9/2009 | Lesso | 375/377 |
| 2002/0105372 A1* | 8/2002 | Balakrishnan et al. | 327/427 |
| 2002/0135339 A1 | 9/2002 | Tang et al. | |
| 2006/0125458 A1* | 6/2006 | Chapuis | 323/282 |
| 2006/0164053 A1* | 7/2006 | Walter et al. | 323/282 |

FOREIGN PATENT DOCUMENTS

WO        8903617 A1    4/1989

OTHER PUBLICATIONS

International Search Report correlating to PCT/IB2006/052667, dated Mar. 14, 2007.

* cited by examiner

*Primary Examiner* — Fred E Finch, III
*Assistant Examiner* — Gustavo Rosario Benitez

(57) ABSTRACT

A voltage regulation apparatus comprises a plurality of individually switchable current sources coupled to an output for coupling the voltage regulation apparatus to an external load. The output is monitored using a bridge divider and a comparator. The bridge divider generates a feedback voltage, that is compared with a reference voltage, representative of a target voltage to be maintained at the output, when loaded. A digital sequencer unit is coupled to the comparator and responds to the comparator to increase or decrease a number of the plurality of individually switchable current sources activated, thereby causing a collective current generated by the activated number of the plurality of individually switchable current sources to converge on a load current, demanded by the external load.

19 Claims, 4 Drawing Sheets

VOLTAGE REGULATION APPARATUS AND METHOD OF VARYING A NUMBER OF CURRENT SOURCES TO PROVIDE A REGULATED VOLTAGE

FIELD OF THE INVENTION

This invention relates to a voltage regulation apparatus of the type that, for example, generates an output voltage at an output, when loaded, and maintains the output voltage. This invention also relates to a method of regulating a voltage of the type that, for example, generates an output voltage at an output, when loaded, and maintains the output voltage.

BACKGROUND OF THE INVENTION

In the field of regulated power supplies, a so-called "linear regulator" employs, inter alia, an operational amplifier serving as an error amplifier, a pass device element and a compensation network in order to maintain stability of an output voltage with changes to current demands of a load coupled to the linear regulator. In this respect, as an integrated circuit, such a circuit occupies a relatively large amount of die space, particularly due to use of a physically large capacitor employed by the compensation network. The circuit therefore constitutes a complex system that requires careful consideration of component values in order to achieve an optimum compromise between phase margin, gain margin, DC gain of the circuit, and/or Gain Bandwidth and other component value characteristics, such as current load, capacitive load and Effective Series Resistance (ESR) of the circuit.

Additionally, such circuits require the specific inclusion of a current limiting circuit to protect the linear regulator circuit as well as the load. The current limiting circuit is typically a closed-loop arrangement requiring another operational amplifier and another compensation network. For the same reasons already stated in relation to the linear regulator circuit, the current limiting circuit requires careful configuration and occupies valuable die space.

STATEMENT OF INVENTION

According to the present invention, there is provided a voltage regulation apparatus and a method of regulating a voltage as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
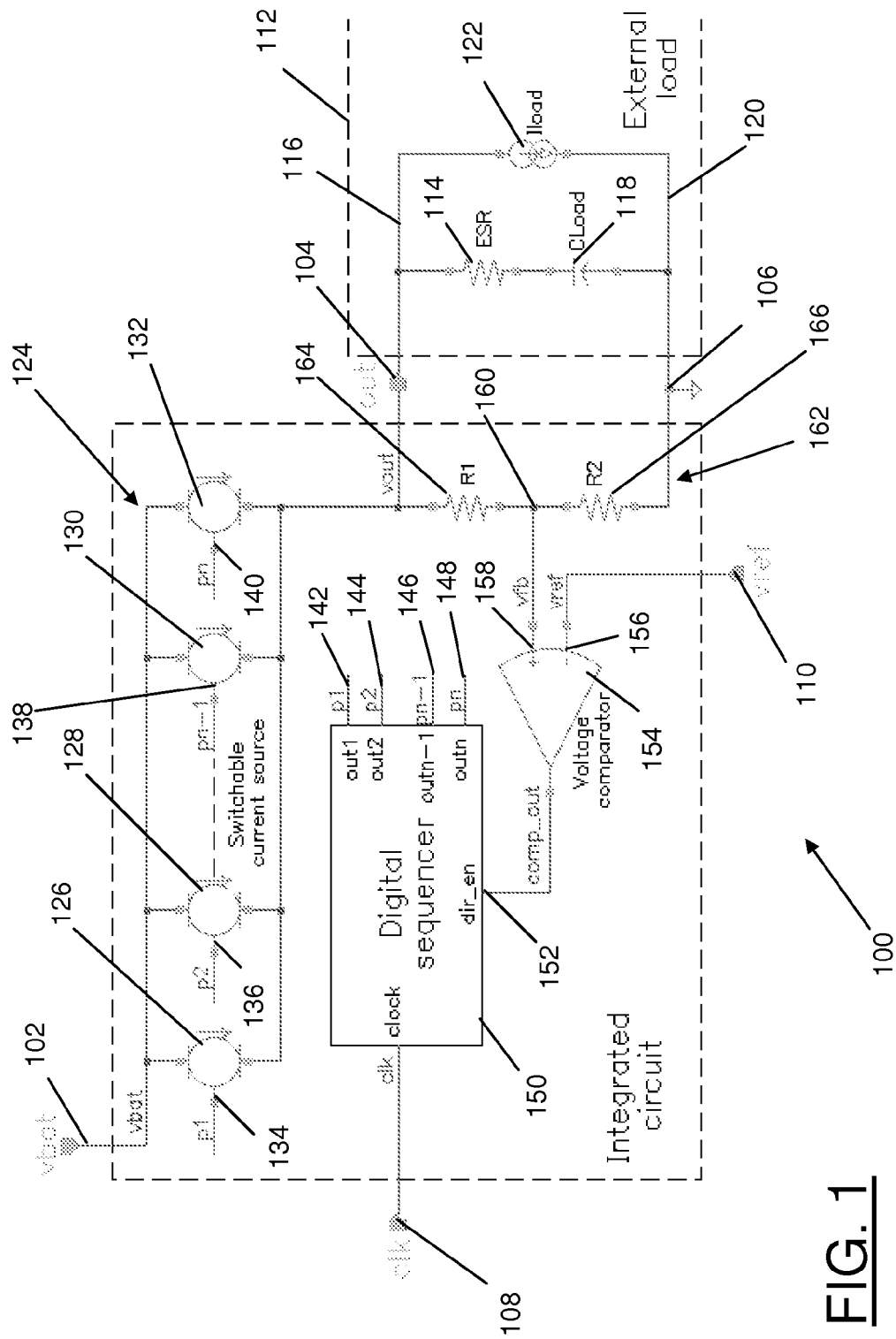
FIG. 1 is a schematic circuit diagram of a voltage regulation apparatus constituting an embodiment of the invention.

Throughout the following description identical reference numerals will be used to identify like parts.

Referring to FIG. 1, a voltage regulation apparatus 100 comprises a supply input terminal 102, a voltage output terminal 104, a ground potential terminal 106, a clock signal input terminal 108 and a reference voltage input terminal 110. The voltage regulation apparatus 100 is implemented as an integrated circuit and is, when in use, coupled to an external load 112. The external load can be any suitable electronic circuit requiring a regulated voltage supply. For the sake of maintenance of generality herein, the external load 112 has an Effective Series Resistance (ESR) 114 of, in this example, between about 100 mΩ and 1Ω, coupled to a first supply rail 116 and a load capacitance ($C_{load}$) 118 of, for example, between 10 µF and 100 µF, the load capacitance 118 being coupled to a second supply rail 120. An effective current load ($I_{load}$) 122 of, for example between about 0 mA and about 100 mA, is coupled to the first and second supply rails 116, 120 in parallel with the ESR 114 and the load capacitance 118.

In this example, the first supply rail 116 and the second supply rail 120 are coupled to the voltage output terminal 104 and the ground potential terminal 106, respectively.

The voltage regulation apparatus 100 comprises a switchable current source 124 comprising a plurality of parallel-coupled individually switchable current sources 124, for example a first individually switchable current source 126, a second individually switchable current source 128, . . . , an $(n-1)^{th}$ individually switchable current source 130 and an $n^{th}$ individually switchable current source 132. In this example, each of the plurality of individually switchable current sources 124 is capable of generating an electric current of 3.5 mA. The plurality of individually switchable current, sources 124 are coupled to the voltage output terminal 104. Also, the first, second, . . . , and $n^{th}$ individually switchable current source 126, 128, . . . , 132 each comprise a first activation terminal 134, a second activation terminal 136, . . . , an activation terminal 138 and an $n^{th}$ activation terminal 140, respectively. The first, second, . . . , and $n^{th}$ activation terminals 134, 136, . . . , 140 are coupled to a first output control terminal 142, a second output control terminal 144, . . . , an $(n-1)^{th}$ output control terminal 146, and an $n^{th}$ output control terminal 148, respectively, of a digital sequencer unit 150. In this example, the digital sequencer unit 150 is a bi-directional shift register of order $2^n$, for example 40, the first, second, . . . , $n^{th}$ output control terminals 142, 144, . . . , 148 being outputs of the bi-directional shift register. Of course, the skilled person will appreciate that any suitable counting device can be used to serve as the digital sequencer unit 150, for example a digital binary counter. Further, if additional performance is required, the digital sequencer 150 can be provided with a digital filter to increase a stability range of the digital sequencer 150, and/or a feed forward loop and/or a boost over-clock to increase transient response time of the digital sequence 150.

In this example, the digital sequencer unit 150 is coupled to the clock signal input 108 and has a count direction input terminal 152. The count direction input terminal 152 is coupled to an output of a comparator 154, for example, a voltage comparator. The comparator 154 has an inverting input 156 coupled to the reference voltage input terminal 110, and a non-inverting input 158 coupled to a node 160 of a feedback voltage source. In this example, the feedback voltage source is a bridge voltage divider 162 comprising a first resistor 164 coupled between the voltage output terminal 104 and the node 160, and a second resistor 166 coupled between the node 160 and the ground potential terminal 106.

The digital sequencer unit 150, the comparator 154 and the feedback voltage source constitute a digital controller, the digital controller being coupled to the switchable current source 124 to form a closed loop control circuit.

Figure 2:
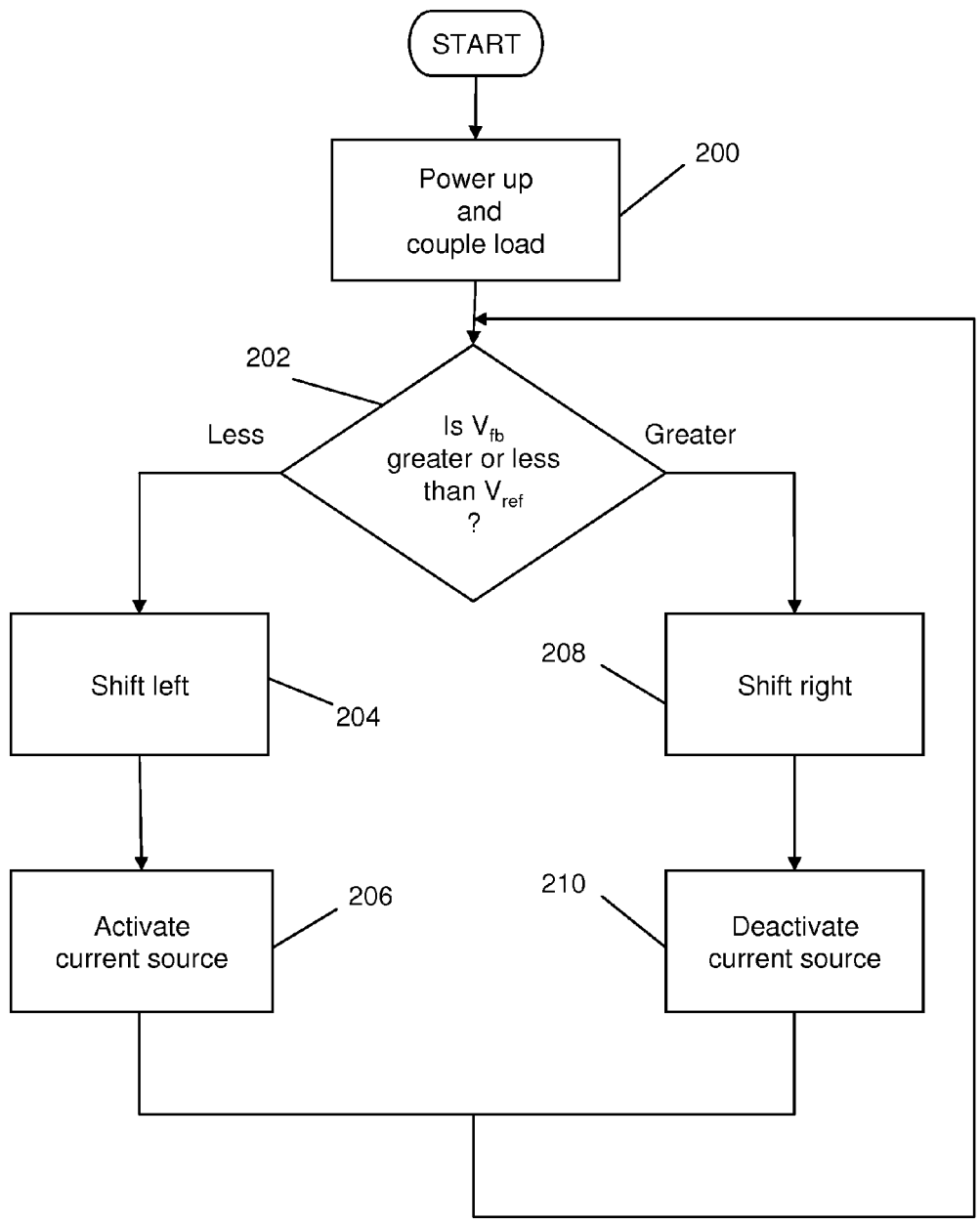
FIG. 2 is a flow diagram of a method of operation of the apparatus of FIG. 1.

In operation (FIG. 2), the voltage regulation apparatus 100 is powered up and coupled to the external load 120, or vice versa (Step 200). Upon coupling of the external load 120 to the voltage regulation apparatus 100, the external load 120 begins to draw the load current ($I_{load}$) 122. At this stage, none of the plurality of individually switchable current sources 124 is activated. Consequently, initially, an output voltage, $V_{out}$, at the voltage output terminal 104 is 0V, resulting in the bridge voltage divider 162 generating a feedback voltage, $V_{fb}$, that is lower than a reference voltage, $V_{ref}$, provided via reference voltage input terminal 110. The reference voltage, $V_{ref}$, is provided by a reference voltage source (not shown) and is representative of a target regulated output voltage that has to be maintained, for example 5V DC. As the feedback voltage, $V_{fb}$, is lower than the reference voltage, $V_{ref}$, a comparison of the reference voltage, $V_{ref}$, with the feedback voltage $V_{fb}$, by the comparator (Step 202) results in the comparator 154 generating a logic 1 signal that is received by the count direction input terminal 152 of the digital sequencer unit 150.

The digital sequencer unit 150 is clocked at a first clock frequency, for example between about 1 MHz and about 100 MHz, by a clock signal received from a clock signal generator (not shown) via the clock signal input 108. In this example, the first clock frequency is 16 MHz. If required, the clock signal input 108 can be coupled to an output of a clock signal multiplexer (not shown), the clock signal multiplexer receiving at an input thereof the clock signal from the clock signal generator. When employed, the clock signal multiplexer comprises a clock signal divider having a control input coupled to the first output control terminal 142 (corresponding to a Least Significant Bit (LSB) of the first, second, . . . , $(n-1)^{th}$, and $n^{th}$ output control terminals 142, 144, . . . , 146, 148). The clock signal multiplexer is arranged to switch the clock signal divider into a signal path between the input and the output of the clock signal multiplexer in response to receipt of a logic 1 voltage signal from the first output control terminal 142, i.e. when the first individually switchable current source 126 has been activated. By reducing the clock speed applied to the digital sequencer 150, power consumption by the voltage regulation apparatus 100 can be reduced.

Figure 3:
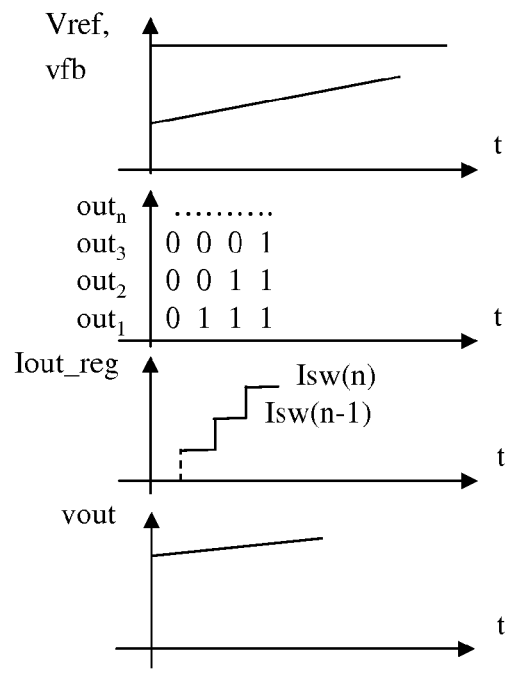
FIG. 3 is a set of graphs showing the effect of incremental steps using the method of FIG. 2.
Figure 4:
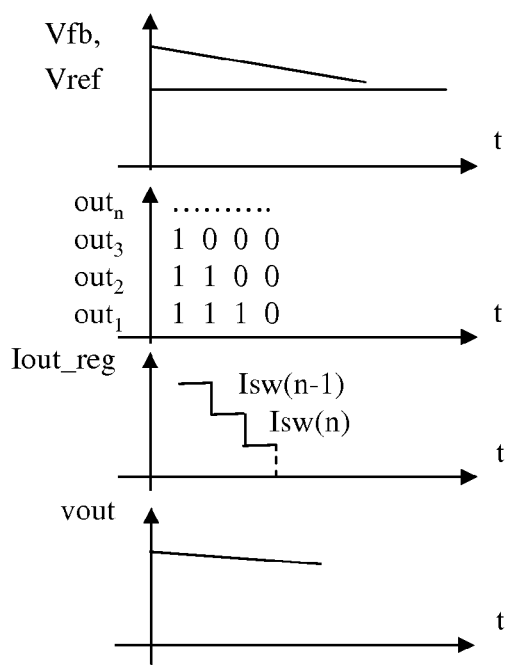
FIG. 4 is another set of graphs showing the effect of decremental steps using the method of FIG. 2.

Referring to FIG. 3, the logic 1 signal input to the digital sequencer unit 150 that is, in this example, the bi-directional shift register, causes the shift register to generate logic 1's and shifts (Step 204) the logic 1's along flip-flops (not shown) constituting the shift register, namely one or more of the first, second, . . . , $(n-1)^{th}$, and $n^{th}$ output control terminals 142, 144, . . . , 146, 148 of the digital sequencer unit 150. The presence of a logic 1 output signal at any one of the first, second, . . . , $(n-1)^{th}$, and $n^{th}$ output control terminals 142, 144, . . . , 146, 148 results in a corresponding one of the plurality of individually switchable current sources 124, respectively coupled to the first, second, . . . , $(n-1)^{th}$, and $n^{th}$ output control terminals 142, 144, . . . , 146, 148, becoming activated (Step 206) as a result of the presence of the logic 1 signal at the respective first, second, . . . , $(n-1)^{th}$, and $n^{th}$ activation terminal 134, 136, . . . , 138, 140. For example, the presence of logic is at the first and second output control terminals 142, 144 result in the first and second individually switchable current sources 126, 128 being activated and each generating an output current $I_{sw}$, resulting in a collective output current, $I_{reg\_out}$, of $2I_{sw}$ flowing through the voltage output terminal 104. As can be readily appreciated, as the number of the plurality of individually switchable current sources activated increases, the collective output current, $I_{reg\_out}$, flowing through the voltage output terminal 104 increases. Likewise, as the number of the plurality of individually switchable current sources 124 activated decreases, the collective output current, $I_{reg\_out}$, flowing through the voltage output terminal 104 decreases (FIG. 4). Hence, by shifting bits in one direction the first, second, . . . , $(n-1)^{th}$, and $n^{th}$, output control terminals 142, 144, . . . , 146, 148 can be used to increase the number of the plurality of individually switchable current sources 124 used to contribute to the collective output current, $I_{reg\_out}$. Similarly, by shifting bits in an opposite direction to that used to increase the collective output current, $I_{reg\_out}$, the first, second, . . . , $(n-1)^{th}$, and $n^{th}$ output control terminals 142, 144, . . . , 146, 148 can be used to decrease the number of the plurality of individually switchable current sources 124 used to contribute to the collective output current, $I_{reg\_out}$.

In this initial example, it can be seen that as the collective output current, $I_{reg\_out}$, increases in a step-wise manner, the collective output current, $I_{reg\_out}$, converges towards the load current, $I_{load}$, 122. As a result of the convergence of the collective output current, $I_{reg\_out}$, on the load current, $I_{load}$, 122, the output voltage, $V_{out}$, rises as does the feedback voltage, $V_{fb}$. Consequently, once the feedback voltage, $V_{fb}$, exceeds the reference voltage, $V_{ref}$, the comparator 154 detects the excessive feedback voltage, $V_{fb}$, and generates a logic 1 output signal that is received at the count direction input terminal 152 resulting in the number of the plurality of individually switchable current sources activated being decreased, i.e. one or more of the plurality of individually switchable current sources are deactivated one-by-one (FIG. 4).

Figure 5:
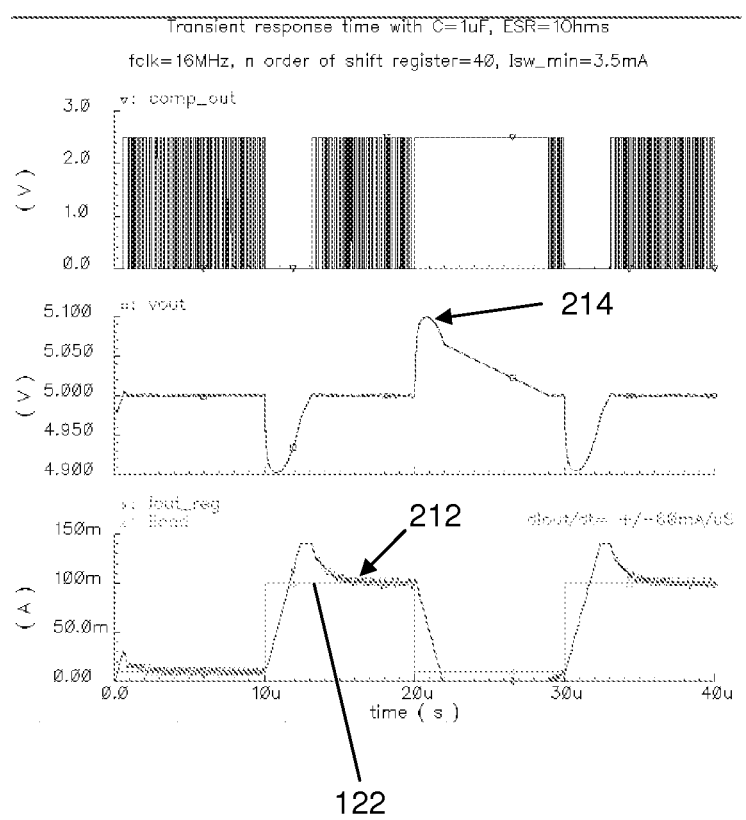
FIG. 5 is a further set of graphs of performance of the apparatus of FIG. 1.

Referring to FIG. 5, due to the discrete nature of increasing or decreasing the number of the plurality of individually switchable current sources, the above operation of the voltage regulation apparatus 100 attempting to converge exactly upon the load current, $I_{load}$, 122 results in the output voltage, $V_{out}$, possessing an inevitable ripple 212.

In order to further demonstrate operation of the voltage regulation apparatus 100, the load current, $I_{load}$ demanded by the external load 112 is decreased significantly to about 10 mA at 20 μs in time, resulting in the output voltage, $V_{out}$, rising 214 suddenly. The increase in the output voltage, $V_{out}$, is reflected in the feedback voltage, $V_{fb}$, and hence detected when compared (Step 202) with the reference voltage, $V_{ref}$, by the comparator 154 resulting in the logic 0 being generated by the comparator 154 causing the digital sequencer unit 150 to reduce the number of the plurality of individually switchable current sources 124 activated and hence reduce the collective output current, $I_{reg\_out}$, the collective output current, $I_{reg\_out}$, falling below the new, reduced, load current, $I_{load}$, 122 by about 22 μs.

Although the above example has been described in the context of the bridge divider 162 comprising the first and second resistors 164, 166, the bridge divider 162 can be a capacitor divider. In this respect, the comparator 154 can be implemented as a latch comparator that is clocked.

The quality of individually switchable current sources constituting the plurality of individually switchable current sources 124, can be varied if the ripple described above needs to be minimised. However, a greater number of individually switchable current sources results in the time taken for the collective output current, $I_{reg\_out}$, to converge on the load current, $I_{load}$, 122 to increase. In order to compensate for the additional delay incurred, the rate of the clock signal can be increased, but the voltage regulation apparatus 100 becomes unstable if the rate of the clock signal is too fast. In this respect, the voltage regulation apparatus 100 has a transfer function associated therewith, the transfer function having a dominant pole at a first frequency, $f_d$, that is a function of the ESR 114 and the load capacitance 118:

$$f_d = f_d = \frac{1}{2\pi \cdot ESR \cdot C_{load}}$$

Additionally, the transfer function has a non-dominant pole at a second frequency, $f_{nd}$ that is a function of the frequency of the clock signal ($f_{ck}$) and the quantity of individually switchable current sources (n) used to form the plurality of individually switchable current sources 124:

$$f_{nd} = \frac{f_{ck}}{n}.$$

As a general rule, if the second frequency is separated by approximately at least one decade of frequency from the first frequency the above-mentioned instability is avoided.

The skilled person will appreciate that the above voltage regulation apparatus 100 benefits from an inherent pulse skipping mode. In this respect, where the voltage regulation apparatus 100 is attempting to converge on the load current, $I_{load}$, 122 when the load current, $I_{load}$, 122 is relatively low, for example less than a minimum current step size, in this example the output current $I_{sw}$, such as about 100 μA, the digital sequencer 150 eventually deactivates all of the plurality of individually switchable current sources to make the collective output current, $I_{reg\_out}$, equal to 0 A. Once the output voltage, $V_{out}$ falls below the reference voltage, the comparator 154 reacts by activating the first individually switchable current source 126 of the plurality of individually switchable current sources 124 resulting in a rapid rise in the output voltage, $V_{out}$. Consequently, the comparator 154 reacts again by deactivating the first individually switchable current source 126. However, due to the presence of the load capacitance 118, a number of clock cycles elapse before the output voltage, $V_{out}$, returns to a sufficiently low level to cause the comparator 154 to bring about activation of the first individually switchable current source 126 again. Hence, clock pulses are effectively "skipped" by the digital sequencer 150 as no instruction is received from the comparator 154 to reactivate the first individually switchable current source 126. An average collective output current, $I_{reg\_out}$, substantially equal to the load current, $I_{load}$, 122 is therefore inherently achieved.

In another embodiment, in order to provide greater resolution at lower values of the output voltage, $V_{out}$, the first individually switchable current source 126 of the plurality of individually switchable current sources 124 corresponding to the Least Significant Bit (LSB) of the first, second, . . . , $(n-1)^{th}$, and $n^{th}$ output control terminals 142, 144, . . . , 146, 148 can be arranged to generate a reduced output current less than the output current $I_{sw}$. The reduced output current is selectively switched on in order to provide greater resolution to the collective output current, $I_{reg\_out}$. This can be necessary, because the ripple on the output voltage, $V_{out}$, is dependent upon the proportion of the collective output current, $I_{reg\_out}$, that the individual output current $I_{sw}$, constitutes, the ripple corresponding to a noise level associated with the output voltage, $V_{out}$. Additionally, use of the reduced output current mentioned above in relation to the first individually switchable current source 126 reduces conductive emissions by the supply rail 102 and hence improves Electromagnetic Compatibility (EMC) performance. This embodiment can be used in conjunction with the clock signal multiplexer mentioned above.

In order to manage thermal dissipation by the plurality of individually switchable current sources, in another embodiment the plurality of individually switchable current sources can be arranged in a spatial configuration that, for example, surrounds other circuit elements, for example the digital sequencer 150, the comparator 154 and the bridge divider 162, thereby reducing the number of surfaces in thermal contact with other individually switchable current sources. Additionally or alternatively, due to the fact that the voltage regulation apparatus 100 implements closed-loop regulation, the plurality of individually switchable current sources can be implemented as a simple switching device, for example a MOSFET in Drain-Source Resistance on (RDSon) mode.

It is thus possible to provide a voltage regulation apparatus and a method of regulating a voltage that has an improved transient response time and a higher cross-over frequency than known voltage regulation apparatus and methods. The value of the collective output current is also inherently limited by the quantity of individually switchable current sources, thereby obviating the need for additional current limiting components. Further, the current limitation is provided without any constraints upon stability of the apparatus irrespective of current load, load capacitance and/or ESR values. Additionally, due to the simplicity of design of the voltage regulation apparatus, die space used can be reduced through use of the voltage regulation apparatus, particularly if implemented fully in the discrete domain, for example a so-called "switched cap" implementation, thereby particularly easily providing compensation for DC offsets of the comparator 154 using an auto-zero calibration technique. Of course, the above advantages are exemplary, and these or other advantages may be achieved by the invention. Further, the skilled person will appreciate that not all advantages stated above are necessarily achieved by embodiments described herein.

The invention claimed is:

1. A voltage regulator apparatus, the apparatus comprising:
    a switchable current source unit having a plurality of individually switchable current sources coupled to an output;
    a transfer function associated therewith, the transfer function having a dominant pole at a first frequency and a non-dominant pole at a second frequency, and the first and second frequencies are separated by a decade of frequency; and
    a digital controller arranged to activate a number of the plurality of individually switchable current sources, thereby providing an output voltage at the output when loaded;
    wherein the digital controller is coupled to the output in order to monitor the output voltage and generates a feedback voltage representative of the output voltage, the digital controller being arranged to vary the number of the plurality of individually switchable current sources activated in response to a change to the output voltage; and
    wherein the digital controller increases the number of the plurality of individually switchable current sources activated in response to the feedback voltage being lower than a reference voltage and decreases the number of the plurality of individually switchable current sources activated in response to the feedback voltage exceeding the reference voltage, wherein the digital controller is arranged to operate in a high resolution mode, a first of the plurality of individually switchable current sources being arranged to generate a first electric current that is smaller than a second electric current generated by a second of the plurality of individually switchable current sources.

2. An apparatus as claimed in claim 1, wherein the digital controller and the switchable current source unit are arranged as a closed loop.

3. An apparatus as claimed in claim 1, wherein the variation of the number of the plurality of individually switchable current sources activated is step-wise.

4. An apparatus as claimed in claim 1, wherein the number of the plurality of individually switchable current sources activated is incremented or decremented.

5. An apparatus as claimed in claim 1, wherein the digital controller comprises a digital sequencer.

6. An apparatus as claimed in claim 1, wherein the digital controller comprises a comparator.

7. An apparatus as claimed in claim 6, wherein the digital controller comprises a digital sequencer, wherein the comparator is coupled to the digital sequencer.

8. An apparatus as claimed in claim 5, wherein the digital sequencer is a shift register.

9. An apparatus as claimed in claim 8, wherein the shift register is bi-directional.

10. An apparatus as claimed in claim 5, wherein the digital sequencer is a binary counter.

11. An apparatus as claimed in claim 6, wherein the comparator comprises a first input coupled to a reference voltage source, and a second input coupled to a feedback voltage source, the feedback voltage source being arranged to generate the feedback voltage representative of the output voltage.

12. An apparatus as claimed in claim 11, wherein the reference voltage source is arranged to generate the reference voltage representative of a target regulated output voltage.

13. An apparatus as claimed in claim 11, wherein the feedback voltage source is a voltage divider.

14. An apparatus as claimed in claim 1, wherein a first clock signal is provided to the digital controller the first clock signal having a first clock speed.

15. An apparatus as claimed in claim 1, wherein a first clock signal is provided to the digital controller the first clock signal having a first clock speed, wherein the digital controller is clocked at a second clock speed that is a proportion of the first clock speed when in the high resolution mode.

16. An apparatus as claimed in claim 1, wherein the first of the plurality of individually switchable current sources is addressable for activation as a least significant bit by the digital controller.

17. An apparatus as claimed in claim 1, wherein the digital controller further comprises any one or more of: a digital filter, a feed-forward loop and/or a boost over-clock.

18. An apparatus as claimed in claim 14, wherein the first of the plurality of individually switchable current sources is addressable by the digital controller as a least significant bit in order to generate a first current pulse temporally spaced from a second current pulse by a number of clock cycles of the first clock signal, the first and second current pulses being generated in response to changes to the output voltage, thereby providing an average load current that is less than an amplitude of at least one of the first and second current pulses.

19. A method of regulating a voltage, the method comprising the steps of:
providing a plurality of individually switchable current sources coupled to an output;
activating, by a digital controller, a number of the plurality of switchable current sources, thereby providing an output voltage at the output when loaded;
generating a feedback voltage representative of the output voltage;
monitoring the output voltage and digitally varying the number of the plurality of individually switchable current sources activated in response to a change to the output voltage;
increasing the number of the plurality of individually switchable current sources activated in response to the feedback voltage being lower than a reference voltage; and
decreasing the number of the plurality of individually switchable current sources activated in response to the feedback voltage exceeding the reference voltage, wherein the digital controller is arranged to operate in a high resolution mode, a first of the plurality of individually switchable current sources being arranged to generate a first electric current that is smaller than a second electric current generated by a second of the plurality of individually switchable current sources, the digital controller having a transfer function associated therewith, the transfer function having a dominant pole at a first frequency and a non-dominant pole at a second frequency, and the first and second frequencies are separated by a decade of frequency.

* * * * *